United States Patent
McKague, Jr.

(10) Patent No.: US 6,454,893 B1
(45) Date of Patent: Sep. 24, 2002

(54) METHOD OF SHAPING CONTINUOUS FIBER LAMINA TO AN UNDULATED SURFACE BY CUTTING INDIVIDUAL FIBERS

(75) Inventor: Elbert Lee McKague, Jr., Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 195 days.

(21) Appl. No.: 09/645,223

(22) Filed: Aug. 24, 2000

(51) Int. Cl.[7] .............................. B32B 5/02; B32B 1/00
(52) U.S. Cl. .................. 156/166; 156/180; 156/210; 156/264
(58) Field of Search .............................. 156/166, 180, 156/264, 269, 270, 512, 210, 221, 224, 433; 264/136, 137, 258; 428/134, 136, 131, 137

(56) References Cited

U.S. PATENT DOCUMENTS

| | | | | |
|---|---|---|---|---|
| 2,800,423 A | * | 7/1957 | Swart | ........................... 156/253 |
| 4,376,749 A | * | 3/1983 | Woelfel | ....................... 156/184 |
| 5,846,356 A | | 12/1998 | Vyakarnam et al. | |
| 5,888,340 A | | 3/1999 | Vyakarnam et al. | |
| 6,025,285 A | | 2/2000 | Vyakarnam et al. | |

\* cited by examiner

Primary Examiner—Michael W. Ball
Assistant Examiner—Barbara J. Musser
(74) Attorney, Agent, or Firm—Bracewell & Patterson, L.L.P.

(57) ABSTRACT

Slits of precisely controlled length are cut in a layer of material having collimated fibers. Each slit begins at a defined coordinate point and proceeds diagonally at an acute angle relative to the axial direction of the fibers. Subsequent slits are initiated at coordinate points relative to the starting coordinate point of the previous slit. The region of fibers located above and below each slit are referred to as upper and lower fiber bands, respectively. The lower bands are substantially aligned in a zonal band that runs perpendicular to the lengths of the fibers. The location of the beginning coordinate point for each slit defining a zonal band is defined by adding a random length dimension to a previous starting coordinate point. The maximum length of the cut fibers may be determined in accordance with the intended application and process. For example, in the case of a corrugated shape that is made by forming a flat laminate into the final corrugated shape in one step, the maximum fiber length is limited to a dimension somewhat less than the period of the corrugations. The minimum length of the fibers is selected to assure maximum load-carrying capacity of the finished composite component.

20 Claims, 4 Drawing Sheets

METHOD OF SHAPING CONTINUOUS FIBER LAMINA TO AN UNDULATED SURFACE BY CUTTING INDIVIDUAL FIBERS

CROSS-REFERENCE TO RELATED APPLICATIONS

The following U.S. Patent Applications by the same inventor, Elbert L. McKague, Jr. are being simultaneously filed and incorporated herein by reference: U.S. Patent Application entitled "Composite Structural Panel with Undulated Body"; U.S. Patent Application entitled "Apparatus And Method For Joining Dissimilar Materials To Form A Structural Support Member"; and by the same inventor together with inventors Ronald P. Schmidt and David T. Uhl, U.S. Patent Application entitled "Composite Material Support Structures With Sinusoidal Webs And Method Of Fabricating Same".

BACKGROUND OF THE INVENTION

1. Technical Field

The present invention relates in general to an improved material and method for enabling conformance to a tool surface that is incompatible with a planar starting configuration or an inextensible material, and in particular to an improved method for controlling and limiting the effects of properties damage that result from achieving conformance by creating fiber segments in an inextensible material. Still more particularly, the present invention relates to randomly distributing and arranging segment zones of fibers such that minimum and maximum fiber lengths are maintained between zones that encompass a vector parallel to the fiber axis.

2. Description of the Prior Art

Structural support spars or I-beams typically have an "I" shaped cross-section, having a web with a crossbar or flange on each end of the web. The web and flanges extend integrally down the length of the beam, but may vary in shape, thickness, etc. For example, a beam with a sinusoidal or sine wave-shaped web increases the apparent section thickness of the web. Beams with sinusoidal webs have been pursued through a variety of design and manufacturing approaches since these structures offer the potential of providing the best stiffness and strength-to-weight performance of any support structures.

Currently, all composite beams having undulated webs utilize composite materials with fibers that extend continuously from the web into the flanges. The fibers are simply turned to the desired angle (90 degrees in beams having flanges that are perpendicular to the web) prior to curing resin in the beam. In essence, two "C" shaped sections are created and then joined back-to-back by co-curing the web area and the flange portions to outer cap laminates that laterally unite the two C-sections.

Fabrication typically involves a great deal of hand working of the composite material into the undulated configuration. An especially labor-intensive step is required to properly turn the fibers at the corners where they transition from the curved to flat geometry between the web and flange portions of the beam. Many techniques have been used to create this configuration including lay-up and cure of previously impregnated ("prepreg") materials, and lay-up of dry fabric followed by resin transfer molding or other resin infusion methods. Because of the inherent manufacturing limitations of these techniques, fabric materials rather than unidirectional materials are usually required. However, simple, low-cost fabrication of composite structures with undulated shapes, such as beaded or corrugated stiffening elements, has not been possible because inextensible fibers cause bridging or wrinkling. This problem is often present even when laid layer by layer to the contour of the forming tool.

An early approach to making discontinuous, fiber prepreg involved stretch-breaking of collimated fibers by tensioning while passing over and around tensioning rollers. In this disclosure, the term "collimated" is used to describe continuous, inextensible fibers which align in exactly the same direction. Typically, this solution produced long, discontinuous fibers that possessed individual fiber segmentation qualities as opposed to bundle segmentation qualities. Although the resulting fibrous material can be impregnated with powdered thermoplastic resin employing electrostatic attraction methods, the material cannot be impregnated with hot melt thermosetting resins without having numerous fibers peel and entangle as they become trapped by the associated machinery. These problems caused serious manufacturing and quality problems. Furthermore, the resulting long fibers span the convex peaks separating convex areas of many parts.

SUMMARY OF THE INVENTION

Slits of precisely controlled length are cut in a layer of material having collimated tows of fibers. Each slit begins at a defined coordinate point and proceeds diagonally at an acute angle relative to the axial direction of the fibers. Subsequent slits are initiated at coordinate points relative to the starting coordinate point of the previous slit. The region of fibers located above and below each slit are referred to as upper and lower fiber bands, respectively. The lower bands are substantially aligned in a zonal band that runs perpendicular to the lengths of the fibers. The location of the beginning coordinate point for each slit defining a zonal band is defined by adding a random length dimension to a previous starting coordinate point.

The maximum length of the cut fibers may be determined in accordance with the intended application and process. For example, in the case of a corrugated shape that is made by forming a flat laminate into the final corrugated shape in one step, the maximum fiber length is limited to a dimension somewhat less than the period of the corrugations. Such a limitation prevents the fiber ends from being pinned against adjacent peaks of the tool. The minimum length of the fibers is selected to assure maximum load-carrying capacity of the finished composite component. The length must be great enough to transfer a shear load equal to the inherent tensile capacity of the fiber along the fiber surface between itself and an adjacent fiber coupled to it by a resin matrix.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT

Figure 1:
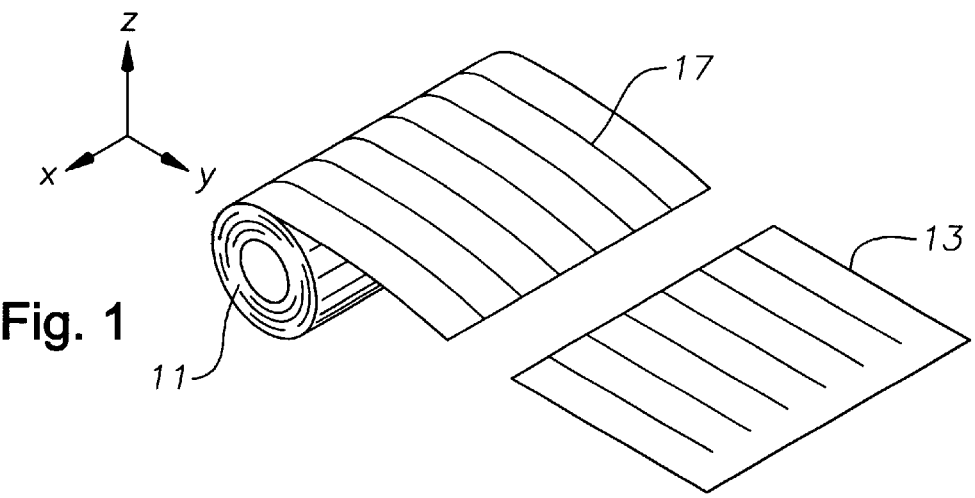
FIG. 1 is a schematic isometric view of a roll of fibrous material.
Figure 2:
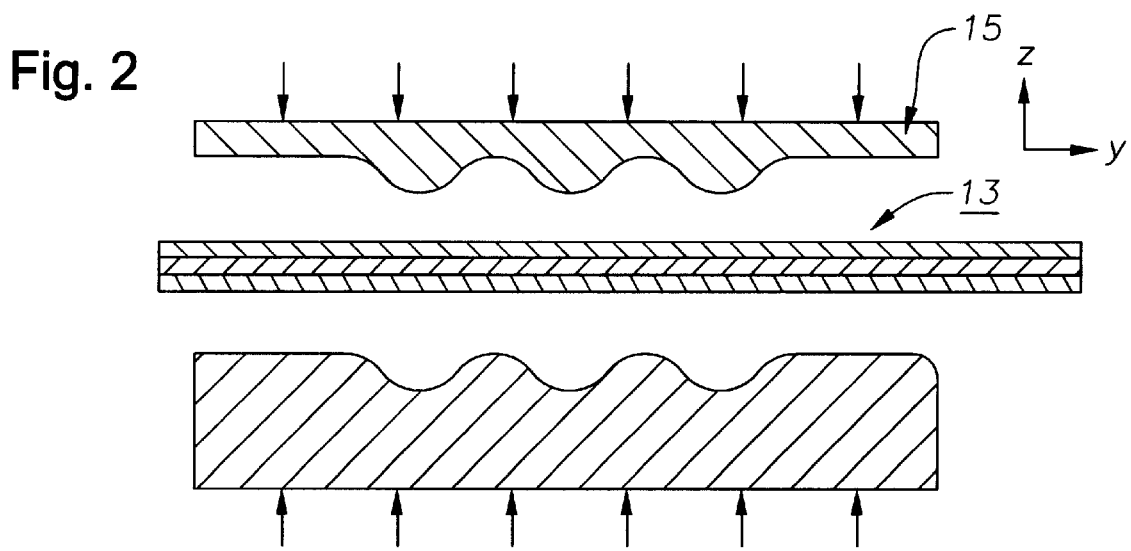
FIG. 2 is a schematic sectional side view of a forming tool for the fibrous material of FIG. 1.

Composite materials that are used to fabricate components typically are supplied in a roll 11 such as the one shown in FIG. 1. Roll 11 contains collimated fibers 17 that are oriented parallel to the length direction of the material coming off of roll 11. Roll 11 yields flat sheets which are cut into patterned pieces or plies 13 for ply-by-ply, laminate lay-up on the contours of a tool 15 (FIG. 2). When the desired part shape is compatible with fabrication using flat patterns, such as a part curved in one direction, then the manufacturing task is relative easy. Such part shapes can be created by either ply-by-ply lay-up to tool contour, or by laying the entire laminate thickness as a flat panel and then forming it to the desired shape in a single operation, as described in U.S. Pat. No. 5,954,898. However, the final part shape of tool 15 is often incompatible with the planar sheet of material. In such cases, forming a flat laminate to the tool configuration and shape of a part may require stretching of the laminate in the fiber direction to deform the sheets of material or laminate to the required shape.

The present invention modifies sheet or roll material forms 11 for composite materials. For unidirectional prepreg materials, the composite materials are formed by feeding collimated bundles or tows of structural fibers 17 (FIG. 1) through a machine to impregnate the fiber bundles with resin. For other material forms, woven fabric, having warp fibers that are parallel to the unrolled length, is fed through the machine. After impregnation, the tows of fibers 17 are cut or segmented such that the material can be deformed by stretching in directions parallel and/or perpendicular to the lengthwise or warp fiber axes. The deformation capability of the segmented material readily enables it to be used in the formation of compound contoured parts of composite materials. The composite material of the end product has a thermoset or thermoplastic resin matrix that is reinforced with the segmented, unidirectional fibers 17 of the forms 11.

Figure 3:
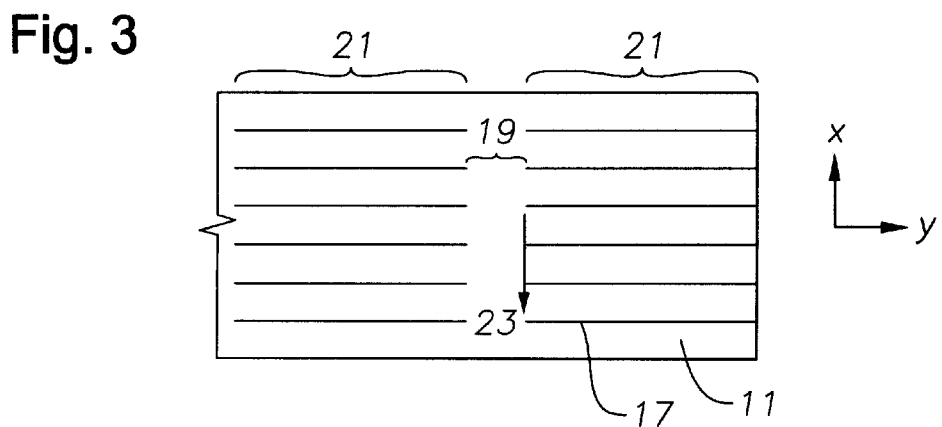
FIG. 3 is an enlarged schematic plan view of the fibrous material of FIG. 1.

As shown in FIG. 3, segmenting the fibers 17 enables deformation in the fiber direction by allowing small gaps 19 to form between the fiber ends during conformance to the tool surface. In FIG. 3, gap 19 is depicted schematically for ease of understanding. In the preferred embodiment (explained in greater detail below), the ends of fibers 17 do not align as shown. Rather, gaps 19 are randomly formed in the individual plies prior to lamination. After lamination, the gaps 19 in the stacked plies of the laminate are misaligned in order to minimize structural weaknesses. However, the gaps 19 can still reduce the mechanical properties of the subsequent composite part, such as tensile strength, in the direction of the reinforcing fibers 17. Strength losses become greater with increases in the number of segmented fibers in a given area or zone 21 which has fiber ends aligned along a vector 23 (x-direction) perpendicular to the axes (y-direction) of the reinforcing fibers. Moreover, allowing one such zone 21 of segmentation to be close to another such zone 21 can further diminish the strength of the part. Thus, zones 21 are spaced apart from each other such that they are discontinuous and randomly distributed, as will be explained below.

Figure 4:
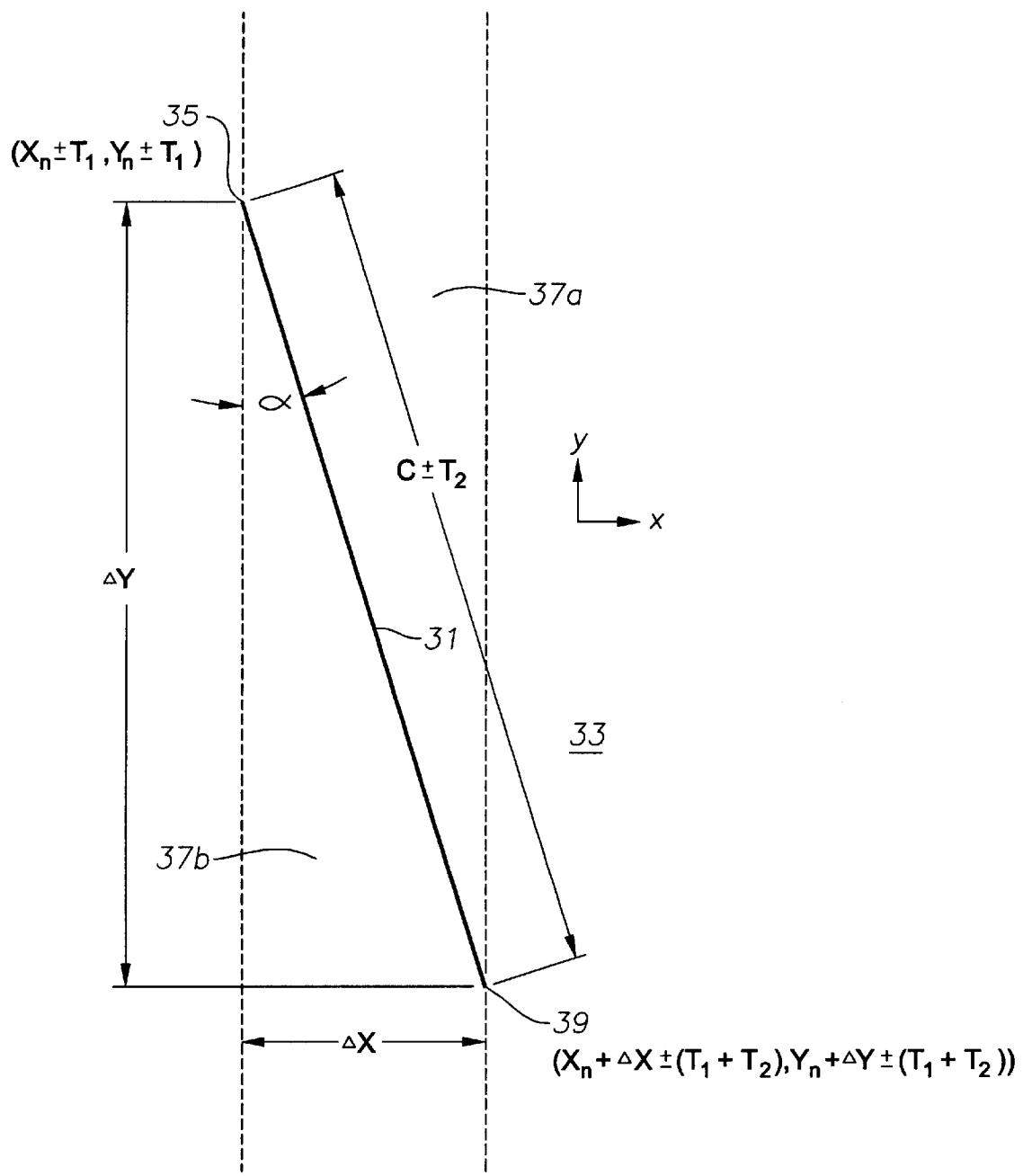
FIG. 4 is a graphic illustration of a representative step of a method according to the present invention.

Referring now to FIG. 4, an appropriate physical means is used to cut an extremely narrow slit 31 of precisely controlled length into a layer 33 of fibrous material. Thus, the fibers 37 through which slit 31 extends are cut into fibers 37a, 37b located above and below, respectively, of slit 31. Slit 31 begins at a coordinate point 35, defined as Xn+/−T1, Yn+/−T1, and proceeds diagonally at an acute angle α (alpha) relative to the axial or y-direction of the fibers 37. The variables "Xn" and "Yn" refer to dimensions from a fixed origin point, and the variable "T1" refers to the dimensional tolerance or accuracy variance with which a machine or device can locate a desired point.

From such a starting point, slit 31 is made in material 33 at angle α with respect to the fiber or y-axis. Slit 31 proceeds along that path for a distance of C+/−T2, to an ending coordinate point 39 given by: Xn+Δx +/−(T1+T2), Yn+Δy+/−(T1+T2), wherein T2 is the cutting length tolerance. Angle α is as small as is compatible with the process of cutting slits. In the preferred embodiment, angle a is in the range of 5 to 45 degrees. The length of slit 31, C+/−T2, is of such length as to form a value "Δx" that represents as small of a percentage of one inch as is practical. For example, a target value of Δx on the order of 0.015 to 0.020 inches may be practical depending upon the means for making the slits, whereas a different means for making the slits might require Δx to be on the order of 0.075 to 0.100 inches. The maximum value of the tolerances is added to/subtracted from the value of Δx to assure that no continuous fibers remain after completing all of the segmentation cuttings.

In the subsequent steps (FIG. 5), a series of slits 31 are cut into the layer of fibrous material 33 beginning at a coordinate point that is defined in relationship to the starting coordinate point 35 of the previous slit 31. Each slit cuts fibers 37 into two fiber segments (see cut fiber segments 37a–37e). The region of fibers 37 located to the left and right of the fiber bundles below a given slit (i.e., in the x-direction) are referred to as "fiber bands." The slits 31 are spaced apart, one relative to the previously cut slit 31, by the distance Δx to form sequential fiber bands of increasing fiber band number. The region below each slit 31 is referred to as the "lower band," and the region above each slit 31 is referred to as the "upper band." The fiber bands are sequentially numbered for ease of reference, counting from one and proceeding parallel to the x-axis and away from the x-axis origin.

The lower bands below the respective slits 31 are roughly aligned in a "zonal band" that runs perpendicular to the y-axis. These zonal bands are referred to as "y-axis course M," where "M" is a sequentially increasing number. The y-coordinate location of the beginning coordinate point for each slit 31 defining and becoming a member of a zonal band is defined by adding a random length dimension to a previous starting coordinate point. In the case of the first zonal band, the previous starting coordinate is zero. The random length dimensions are determined by multiplying a randomly-generated number between zero and one, by the difference between a maximum fiber length (Lmax) and a minimum fiber length (Lmin). The result of that calculation is then added to the minimum fiber length to provide the next starting point. For example, the y-coordinate starting point for the first zonal band is expressed mathematically by the following expression.

$$Y1 = 0 + RAND(\,)*(Lmax - Lmin) + Lmin$$

The maximum fiber length (Lmax) is determined in accordance with the intended application and process. For example, in the case of a corrugation shape that is made by forming a flat laminate into the final corrugation shape in one step, the maximum fiber length is limited to a little less than the period (i.e., peak-to-peak spacing) of the corrugations. Such a limitation prevents the ends of the fibers from being pinned to adjacent peaks of the tool, which would prevent the fibers from being pressed all the way down into the troughs of the corrugations. In most cases, a maximum fiber length on the order of 2.5 to 3.0 inches is appropriate. In the preferred embodiment of the present invention, a maximum fiber length of 2.65 inches is used.

The minimum fiber length (Lmin) is selected on the basis of assuring maximum load-carrying capacity of the finished composite component. Such a requirement ensures that the length is great enough to transfer a shear load equal to the inherent tensile capacity of the fiber along the fiber surface between itself and an adjacent fiber coupled together by a matrix of either thermosetting or thermoplastic resin. In the preferred embodiment of the present invention, a minimum fiber length of 0.5 inches is used conservatively. The mean length of fiber band 1 for course 1 is defined as F1.

Figure 5:
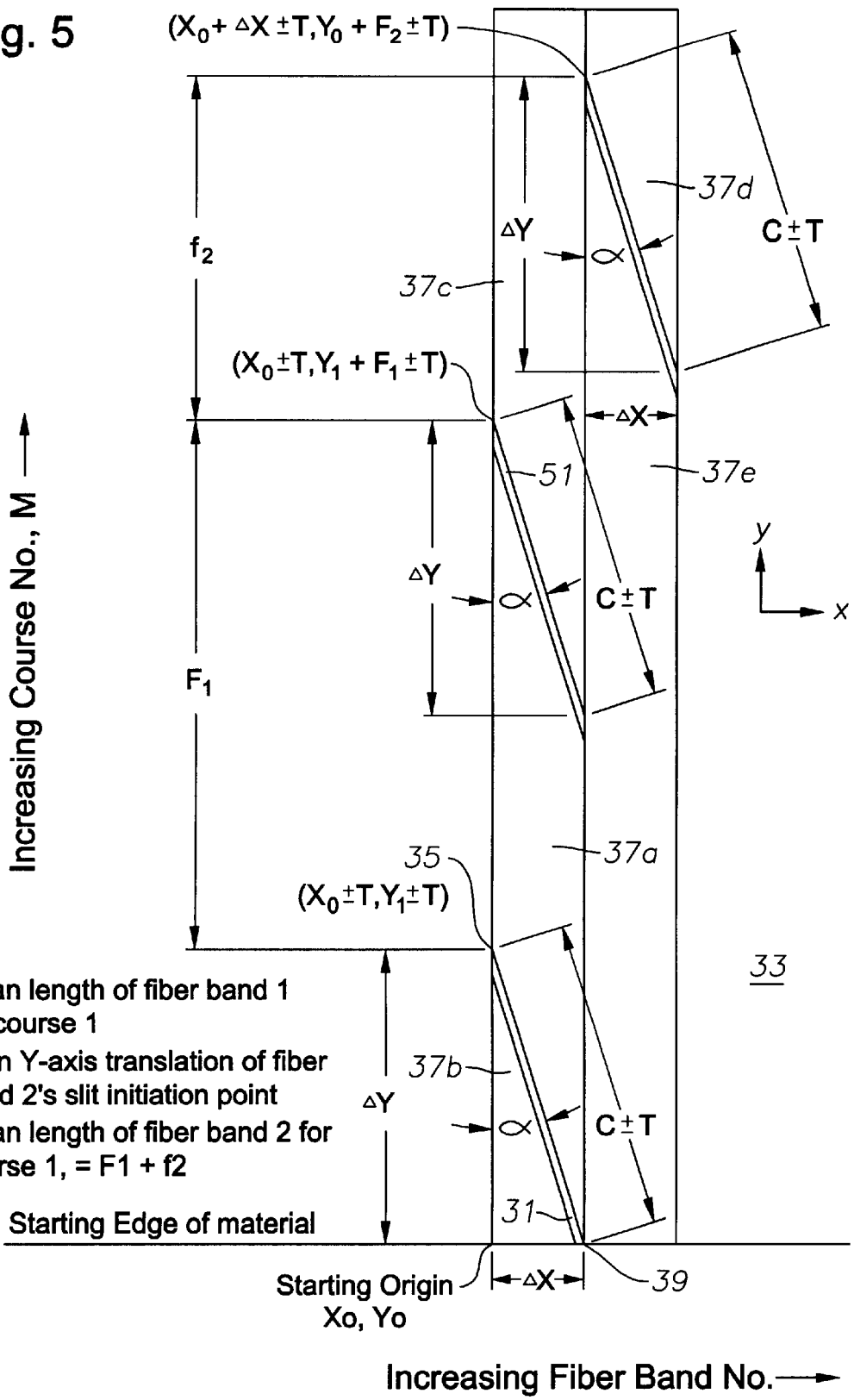
FIG. 5 is a schematic drawing of relationships between said representative step of the method of FIG. 4.

The second zonal band is generally located above the first zonal band of FIG. 5. The second zonal band is created along the fiber axis by calculating random lengths for each adjacent fiber band. A slit 51 (FIG. 5) is made parallel to the slit 31 below it and directly in line with it in the y-direction. The calculations of random lengths are made in the same manner as described above. The mean Y-axis translation of the slit initiation point for fiber band 2 is defined as f2, and the mean length of fiber band 2 for course 1 is F1+f2.

Subsequent zonal bands are formed until slits have been randomly placed throughout the length and width of the sheet of material. Because of the statistical nature of randomly generated and summed lengths, a given zonal band will not be defined by a rectangle. Rather, it will be defined by randomly undulating lines such that at any given distance from the starting point along the fiber axis, there will appear to be one or more zonal bands represented whose adjacent band members are distant from it. Toward the end of the sheet of material 33, it may be necessary to form one or more zonal bands that do not contain immediately adjacent fiber band members.

Various methods may be employed to cut the randomly located slits into the sheet of material. In the preferred embodiment of the present invention, the slits are cut using ultrasonically-actuated blades. The blades are positioned in an appropriate manner that enables cuts to be made to a controlled depth that does not cut through the backing or carrier paper on which the prepreg is placed before rolling up and delivery. Positioning of the blades are determined in-process using the random number generating feature of the computer used to control the gantry machine. The head of a suitable machine may be placed on an appropriate carriage and located at the end of a conventional commercial impregnation machine to cut randomly-located slits in the material as the material leaves the impregnation machine to be rolled up for packaging. This type of device should be compatible with normal manufacturing line speeds of approximately 15 to 20 feet per minute.

Figure 6:
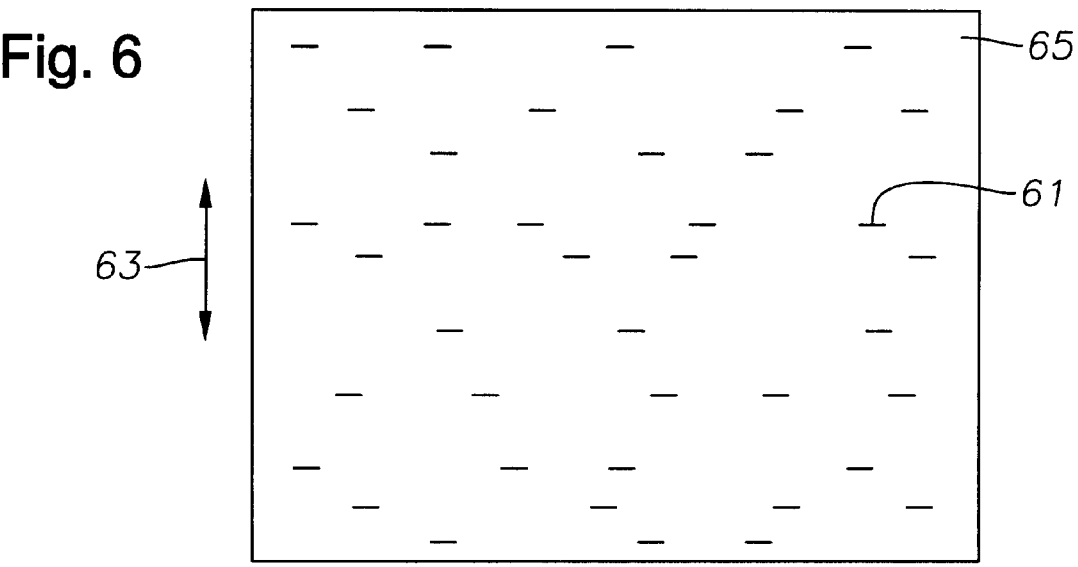
FIG. 6 is a schematic plan view of a roll of fibrous material that has been processed in accordance with the invention.
Figure 7:
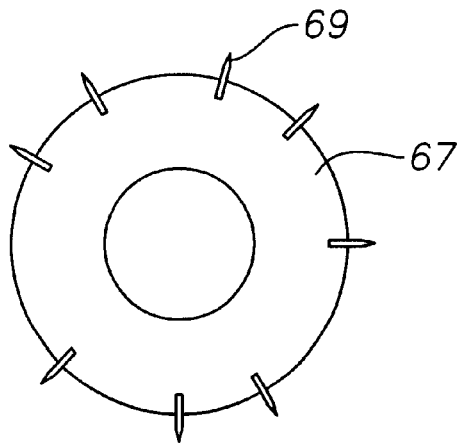
FIG. 7 is a schematic end view a drum utilized in an alternate embodiment of the invention.
Figure 8:
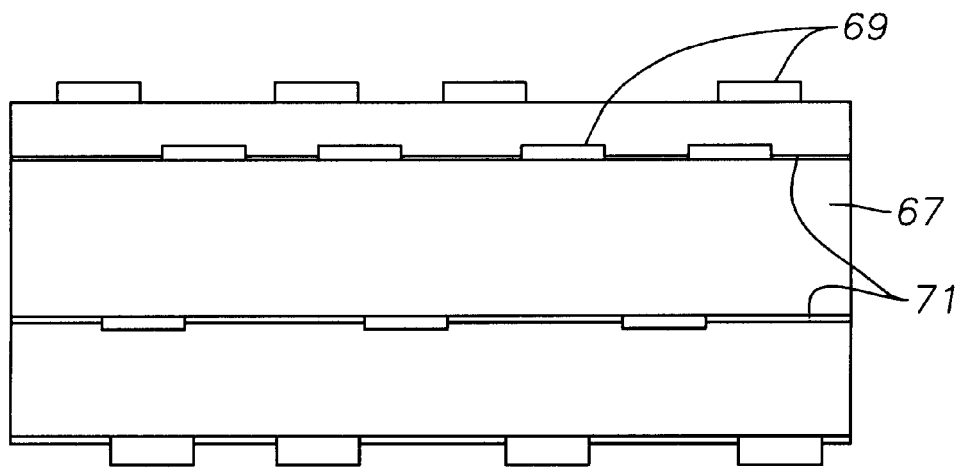
FIG. 8 is a side view of the drum of FIG. 7.

Referring now to FIGS. 6–8, an alternate embodiment of the present invention forms random or pseudo-random slits 61 (FIG. 6) that are perpendicular to the fiber direction (indicated by arrow 63) of the sheet of prepreg material 65. In one version of this embodiment, the perpendicular slits 61 are cut in the discontinuous fiber thermoseting prepreg material by a drum or cylinder 67 (FIGS. 7 and 8) having small blades 69 positioned in axial grooves 71 in its outer surface. Alternately, blades 69 may be positioned in discrete slots by inserting from inside or outside of the cylinder wall in such a manner as to lock them in place, yet enable subsequent removal when necessary to replace them with new, sharper blades. When cylinder 67 is rolled over the prepreg 65 with appropriate downward force, the blades 69 punch slits 61 into the material 65 to cut the fibers therein. The slits 61 are oriented perpendicular to the fiber axes 63, resulting in a maximum damage state to the subsequent strength performance of material 65. In addition, because the blades 69 are positioned within axial grooves 71 in the roller 67, slits 61 in the material 65 may be aligned to produce a further degradation of subsequent strength. Alternatively, blades 69 may be staggered and pseudo-randomly placed throughout grooves 71 to improve material strength. A preferable method, as mentioned previously, is to have blades 69 positioned in discrete slots by inserting then from inside or outside of the cylinder wall in such a manner as to lock them in place, rather than sliding them into grooves. The discrete slots are dispersed about the drum circumference in a more nearly-random manner to diminish the accumulated notch-sensitive effects resulting from alignment of the slits.

The present invention has many advantages including imparting fiber-direction "stretch" to a prepreg material while minimizing damage to composite material strength by orienting slits at an acute angle relative to the fiber axes. This configuration has lower stress concentration than slits oriented perpendicular to the fiber axes. The present invention further minimizes damage to material strength by randomly dispersing the slits over the surface of the material. In effect, this feature misaligns the fiber discontinuities created by the slits in the load-carrying paths of the fibers to further minimize weakness in the material. The invention provides a controlled-damage state for either thermoplastic or thermosetting resin matrices. In addition, the resulting product can be tuned for a particular application and process by setting the maximum fiber length from which random lengths are calculated. Acceptable fiber-to-fiber load transfer capability is maintained by setting a minimum fiber length above which random lengths are calculated.

The present invention also produces a material which can enable low-cost fabrication of components with compound curvatures or reticulating curvatures using processes, such as those described in U.S. Pat. No. 5,954,898, with bi-directional deformation capability. In addition, woven fabric prepreg has an additional uni-axial or bi-directional deformation capability. The process provides a controlled-damage state material by cutting randomly determined slits in a material sheet or roll using a gantry-driven, computer controlled machine having ultrasonically-actuated blades or other suitable cutting devices. The process maintains material handling integrity by forming the slits without cutting through the backing or carrier sheet of the material. The zones of segmented fiber vectors and lengths are based upon mathematical modeling according to principles of fracture mechanics, and the zones are distributed according to probabilistic principles.

While the invention has been shown or described in only some of its forms, it should be apparent to those skilled in the art that it is not so limited, but is susceptible to various changes without departing from the scope of the invention.

What is claimed is:

1. A method of intentionally inflicting controlled damage to create a conformable material, comprising the steps of:
   (a) impregnating continuous unidirectional collimated fibers with a resinous matrix to form a web, which is then cut to define sheets of material wherein the fibers extend in a longitudinal direction;
   (b) forming a series of slits in the sheets that are diagonal to the longitudinal direction of the fibers, such that the collimated fibers are cut into segmented fibers having precisely-controlled lengths and ends that are diagonal to the longitudinal direction; and
   (c) laying the sheets on a tool having a corrugated contour with multiple peaks to form a laminate in which the segmented fibers have lengths that are less than a period of the corrugated contour as as to avoid the fiber ends being pinned against adjacent peaks.

2. The method of claim 1 wherein the collimated fibers of step (a) comprise braided tows of fibers.

3. The method of claim 1 wherein step (b) comprises forming the slits at an angle in the range of 5 to 45 degrees relative to the longitudinal direction.

4. The method of claim 1, further comprising the step of spacing the slits apart from each other such that the slits are discontinuous and randomly distributed.

5. The method of claim 1, wherein:
   the segmented fibers extending between any two of the slits define a fiber band; and
   the lengths of the segmented fibers within any one of the fiber bands are the same, and the lengths of the fiber bands are randomly distributed between a minimum length and a maximum length.

6. The method of claim 5 wherein the defining step comprises setting the minimum length of each of the fiber bands such that a shear load equal to an inherent tensile capacity of each of the segmented fibers is transferred through the resinous matrix to adjacent ones of the segmented fibers within the same fiber band.

7. A method of intentionally inflicting controlled damage to create a conformable material, comprising the steps of:
   (a) impregnating unidirectional, continuous, collimated fibers with a resinous matrix to form a web, which is then cut to define sheets of material wherein the fibers extend in a longitudinal direction;
   (b) forming a series of slits in the sheets such that the collimated fibers are cut into segmented fibers having precisely-controlled lengths, wherein the segmented fibers are divided by the slits into fiber bands, the length of any one of the segmented fibers within each of the fiber bands being the same as all other of the segmented fibers within the same fiber band, and the fiber bands within each of the sheets having a variety of lengths selected between a minimum and a maximum; and
   (c) laying the sheets on a tool having a corrugated contour with multiple peaks to form a laminate, the lengths of the fiber bands being selected such that the segmented fibers therein have lengths that are less than a period of the corrugated contour so as to avoid the fiber ends being pinned against adjacent peaks.

8. The method of claim 7 wherein step (b) comprises forming the slits in the sheets diagonal to the longitudinal direction of the fibers such that the segmented fibers within the fiber bands have ends that are diagonal to the longitudinal direction.

9. The method of claim 8 wherein step (b) comprises forming the slits at an angle in the range of 5 and 45 degrees relative to the longitudinal direction.

10. The method of claim 7 wherein step (b) comprises forming the slits in the sheets perpendicular to the longitudinal direction of the fibers.

11. The method of claim 7, further comprising the step of spacing the slits apart such that the slits are discontinuous and randomly distributed.

12. The method of claim 7, further comprising the step of setting the minimum length of each of the fiber bands such that a shear load equal to an inherent tensile capacity of any one of the segmented fibers is transferred through the resinous matrix to adjacent ones of the segmented fibers within the same fiber band.

13. The method of claim 1, wherein all of the slits on any one of the sheets of material are formed at the same angle relative to the longitudinal direction.

14. The method of claim 1, wherein the segmented fibers extending between two of the slits comprise a fiber band, and wherein the segmented fibers within any one of the fiber bands have the same length.

15. The method of claim 7, wherein all of the slits on any one of the sheets of material are formed at the same angle relative to the longitudinal direction.

16. The method of claim 7, wherein step (b) comprises providing a cylinder having a plurality of blades protruding therefrom, and rolling the cylinder over the sheets of material to cause the blades to form the slits.

17. The method of claim 7, wherein step (b) comprises providing a cylinder having a plurality of blades protruding therefrom, the blades being at a variety of distances from each other and staggered from each other from one end of the cylinder to another end of the cylinder, then rolling the cylinder over the sheets of material to cause the blades to form the slits.

18. The method of claim 7, wherein step (b) comprises providing a cylinder with an axis of rotation and a plurality of blades of equal width protruding therefrom, the blades being parallel to the axis and positioned in a plurality of rows that extend around the sidewall of the cylinder, the blades being spaced apart from each other in each row a variety of distances, the blades in any one of the rows being staggered relative to the blades in adjacent rows, then rolling the cylinder over the sheets of material to cause the blades to form the slits.

19. A method of forming a laminate, comprising:
   (a) impregnating continuous, unidirectional fibers with a resinous matrix to form a web, which is then cut to define sheets of material wherein the fibers extend in a longitudinal direction;
   (b) providing a cylinder with an axis of rotation and a plurality of blades protruding therefrom, the blades being parallel to the axis, having lengths much smaller than a length of the cylinder, and positioned along the length of the cylinder in a plurality of rows that extend around the sidewall of the cylinder, the blades being spaced apart from each other in each row a variety of distances, the blades in any one of the rows being staggered relative to the blades in adjacent rows;

(c) rolling the cylinder over the sheets of material to cause the blades to form a plurality of slits in the sheets of material and cutting the unidirectional fibers into fiber segments; and (d) laying the sheets on a tool having a corrugated contour to form a laminate, the blades in each row being positioned such that the segmented fibers have lengths that are less than a period of the corrugated contour so as to avoid the fiber ends being pinned against adjacent peaks.

20. The method according to claim 19 wherein the blades have the same lengths.